Oct. 7, 1924.

C. BORNMANN 1,511,158

FILM SPOOL HOLDER

Filed March 24, 1924

INVENTOR
CARL BORNMANN
BY
Philip S. Hopkins
ATTORNEY

Patented Oct. 7, 1924.

1,511,158

UNITED STATES PATENT OFFICE.

CARL BORNMANN, OF BINGHAMTON, NEW YORK, ASSIGNOR TO ANSCO PHOTOPRODUCTS, INCORPORATED, OF BINGHAMTON, NEW YORK.

FILM-SPOOL HOLDER.

Application filed March 24, 1924. Serial No. 701,444.

*To all whom it may concern:*

Be it known that I, CARL BORNMANN, a citizen of the United States, and a resident of the city of Binghamton, county of Broome, and State of New York, have invented a new and useful Improvement in a Film-Spool Holder, of which the following is a description, reference being had to the accompanying drawing, which forms a part of this application.

My invention relates to photographic cameras and particularly to that type known as box cameras. More specifically my invention is directed to a novel form of film spool holder for box cameras whereby said spools may be rotatably held in proper position while the film is wound from one to the other.

The principal object of my invention is to provide such a holder which with a minimum amount of resistance will support a film spool and which permits easy removal or insertion thereof.

Another object is to construct such a holder in as few parts as possible thereby rendering the same extremely simple in operation and inexpensive to manufacture.

A further object contemplates the use of a single piece of material to provide a cup journal for one end of the spool, a pin journal, and means for securing the holder to the camera.

Another object is to provide my improved holder with a spool journal which permits free rotation of the spool therein and at the same time prevents said spool from getting out of alinement or binding.

Other objects and advantages in details of construction and operation will be apparent as the description proceeds, reference being had to the accompanying drawing wherein like reference numerals indicate like parts.

Figure 1:
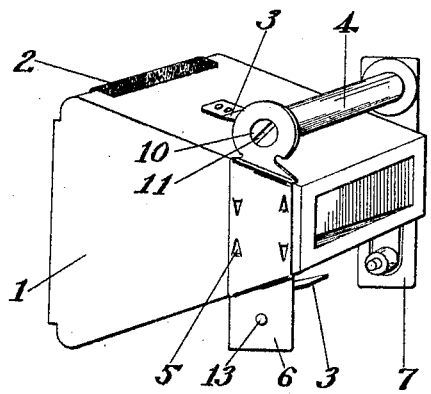
Figure 1 is a perspective view of the cone or inner film carrying member of a camera showing clearly the outer side of my new holder.
Figure 2:
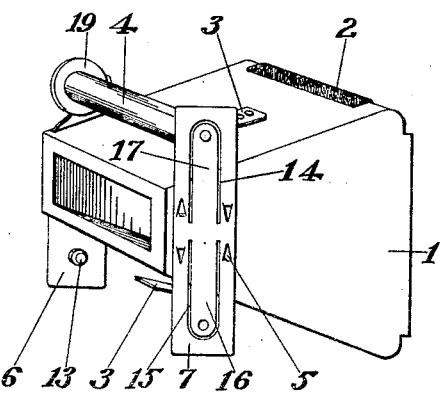
Figure 2 is also a perspective similar to Fig. 1 showing the opposite side of the cone and holder.
Figure 3:
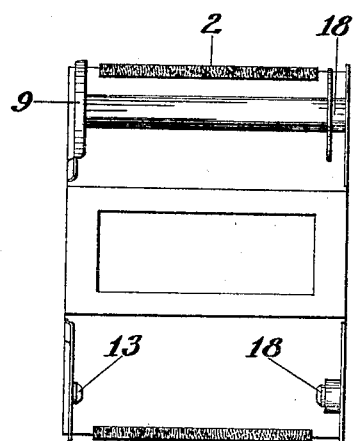
Figure 3 is a front end view of the parts shown in Figs. 1 and 2.
Figure 4:
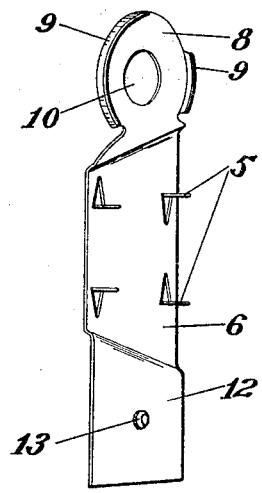
Figure 4 is a detailed perspective view of my improved holder detached from the cone.

Reference numeral 1 refers to the cone or inner structure of a box camera and as shown is provided at its rear end with strips 2 of velvet or other soft material over which the film (not shown) passes when being wound from one spool to the other.

Tension springs 3 are secured on the top and bottom of the cone 1, the free ends thereof being adapted to bear against the spools to prevent overrunning of the same. Spools 4 are mounted in the holder about to be described.

Secured to the sides of the cone 1 near the front thereof as by means of prongs 5, are spool holders 6 and 7. It will be noted that the prongs 5 are struck from the material forming these holders thus eliminating screws or nails or other securing means for mounting said holders upon the cone.

The holder 6 is provided at one end with a cup shaped journal or bearing 8 provided thruout the greater part of its periphery with inturned flanges 9 and with an opening 10 in the center thereof thru which the winding key of the camera (not shown) engages with the slot 11 in the end of the spool 4. The opposite end 12 of the holder 6 is provided with a rigid pin journal 13 extending inwardly therefrom. It will be noted that the ends 8 and 12 of my improved holder are offset inwardly from the central portion thereof, such offsets being formed on the lines of the cone 1. This construction performs a double function of holding the spools in proper alinement and of preventing the holder 6 from becoming distorted or twisted out of position on the cone.

The holder 7 is slotted or cut out as at 14 and 15 to provide the spring tension fingers 16 and 17, the free ends of which carry on their inner sides pin journals 18 adapted to engage in the usual openings in the ends of the spools 4. The body of the holder 7 is rigidly held in position on the cone 1 by means of the prongs 5. It will be obvious from the foregoing description that to insert or remove a spool from the holders it is necessary simply to push the spool lengthwise against the pin journals 18 which will cause the fingers 16 or 17 as the case may be to flex outwardly thus permitting the flange 19 of the spool to be lifted out of or inserted in cup bearing 8 or into or out of engagement with the pin journal 13.

It will be noted that the holders 6 and 7 are each practically of one piece construction and therefore inexpensive to manufacture and decidedly simple in operation. They are preferably stamped from sheet metal and holder 7 particularly should be of some spring material such as spring steel or brass.

From the foregoing it is obvious that I have designed an improved film spool holder for cameras embodying many features and advantages which are highly desirable. It will be understood of course by those skilled in the art that my invention is susceptible to various forms and modifications without departing from the scope thereof and I do not limit myself to the exact form disclosed other than by the appended claims.

I claim:

1. A film spool mount for cameras comprising a support, a holder fastened to one side of said support and having a cup shaped bearing at one end thereof and a pin journal at its opposite end, and resilient pin journals mounted upon the opposite side of said support.

2. A film spool mount for cameras comprising a support and a holder secured to one side of said support, the ends thereof being offset slightly inwardly on the lines of said support, one end providing a cup shaped journal, and resilient pin journals on the opposite side of said support.

3. A film spool mount for cameras comprising in combination a support and a film spool provided with end flanges, a holder secured to one side of said support one end thereof forming a cup shaped journal for one of said flanges, and resilient pin journals on the opposite side of said support.

4. A film spool journal for cameras comprising a one piece holder provided at one end with a cup shaped bearing and at the opposite end with a pin journal, said ends being offset inwardly from the central portion of said holder on lines conforming to the contour of a camera part to which they are secured.

5. A film spool journal for cameras comprising a one piece holder provided at one end with a cup shaped bearing and at the opposite end with a pin journal, said ends being offset inwardly from the central portion of said holder on lines conforming to the contour of a camera part to which they are secured, said central portion of said holder being provided with integral means for securing said holder to a support.

CARL BORNMANN.